United States Patent [19]

Tamblyn

[11] Patent Number: 5,467,919
[45] Date of Patent: Nov. 21, 1995

[54] AIR CONDITIONING SYSTEM PROVIDING FOR INDIVIDUAL WORK STATION CONTROL

[76] Inventor: Robert T. Tamblyn, Suite 200 2 Sheppard Ave. E., North York Ont., Canada, M2N5Y7

[21] Appl. No.: 113,070

[22] Filed: Aug. 30, 1993

Related U.S. Application Data

[63] Continuation-in-part of Ser. No. 753,382, Aug. 30, 1991, Pat. No. 5,275,333.

[30] Foreign Application Priority Data

Aug. 31, 1992 [CA] Canada .................................. 2077199

[51] Int. Cl.⁶ ...................................................... F24F 7/00
[52] U.S. Cl. .............................. 236/49.3; 236/51; 454/258
[58] Field of Search ...................... 236/49.3, 51; 454/258

[56] References Cited

U.S. PATENT DOCUMENTS

| | | | |
|---|---|---|---|
| 2,701,998 | 2/1955 | Wulle | 454/903 |
| 2,900,918 | 8/1959 | Thomas et al. | 137/554 X |
| 4,824,012 | 4/1989 | Tate | 236/49.5 |
| 4,969,508 | 11/1990 | Tate et al. | 165/22 |
| 5,117,900 | 6/1992 | Cox | 236/49.3 |

FOREIGN PATENT DOCUMENTS

| | | | |
|---|---|---|---|
| 761792 | 6/1967 | Canada . | |
| 952760 | 8/1974 | Canada . | |
| 1053062 | 4/1979 | Canada . | |
| 1071005 | 2/1980 | Canada . | |
| 1273524 | 9/1990 | Canada . | |
| 1-244229 | 9/1989 | Japan | 236/51 |
| 2195146 | 8/1990 | Japan | 236/51 |
| 3-75438 | 3/1991 | Japan | 236/94 |

OTHER PUBLICATIONS

Space Pak by Hydro Therm Inc.—Sales Brochure 1990.

*Primary Examiner*—William E. Wayner
*Attorney, Agent, or Firm*—Charles P. Boukus, Jr.

[57] ABSTRACT

Disclosed is an air conditioning system which provides for controlling the flow of conditioned air from a duct to a predetermined location of an occupied area of a building. A fitting is secured at one end thereof to the duct and has a moveable butterfly valve mounted therein for selectively controlling flow of conditioned air therethrough, the fitting including a motor and motor control relay for controlling operation of the valve. An outlet is mounted in association with wall means adjacent the location and spaced from the fitting. A flexible conduit is connected to another end of the fitting means and extends from the fitting means to and is connected with the outlet means. A remote signal receiver is in electrical circuit with the motor means and motor control relay and is located to receive a transmitted signal and there is a remote controlled signal transmitter signal compatible with the receiver whereby an occupant in the location may remotely control through actuation of the transmitter, the position of the valve in the fitting means and thus control the flow of conditioned air through the outlet means to the location.

7 Claims, 8 Drawing Sheets

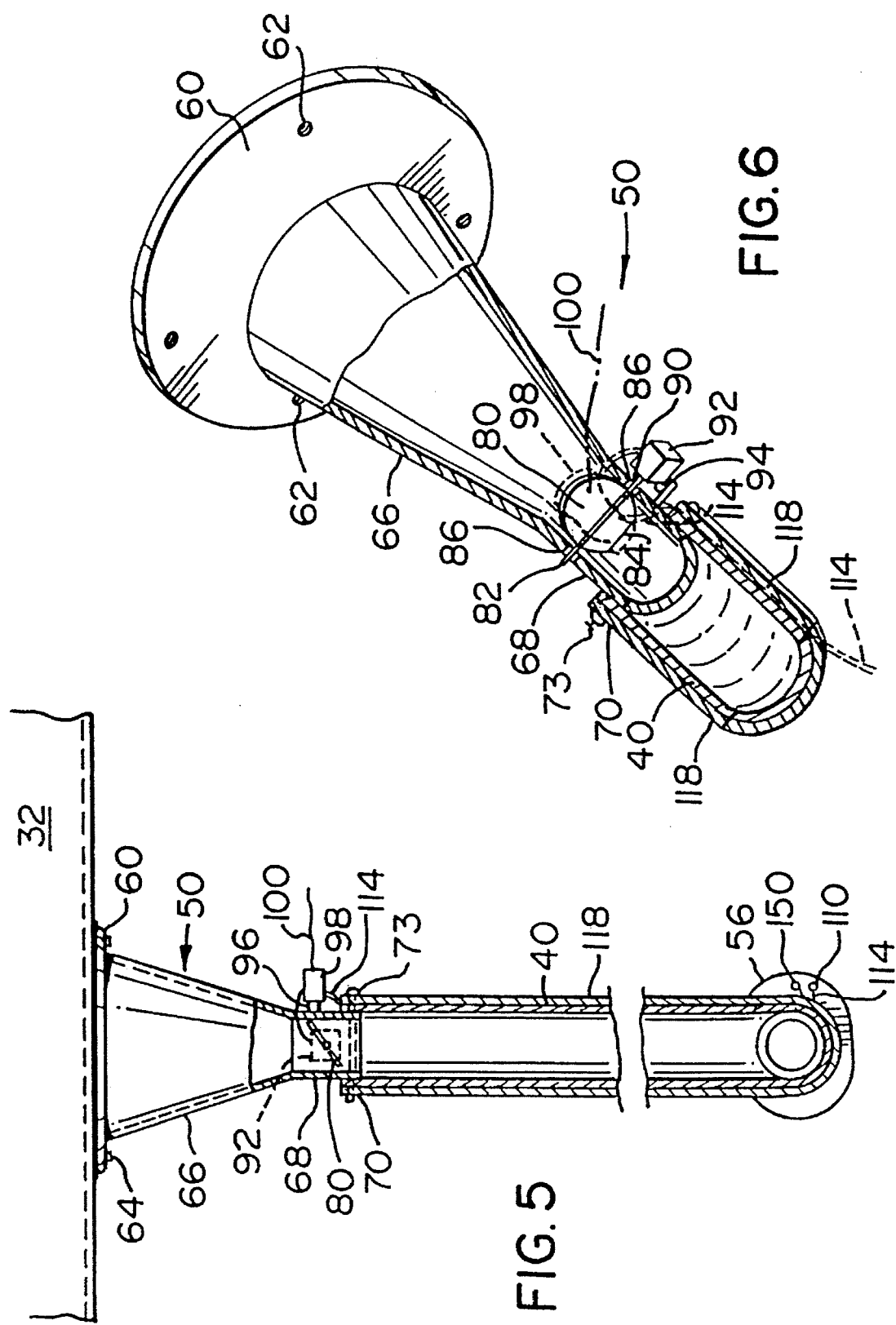

AIR CONDITIONING SYSTEM PROVIDING FOR INDIVIDUAL WORK STATION CONTROL

The present application is a continuation-in-part of U.S. patent application Ser. No. 753,382, filed Aug. 30, 1991, now U.S. Pat. No. 5,275,333.

FIELD OF THE INVENTION

The present invention relates to a system for air conditioning occupied areas and more particularly relates to providing an enhanced air conditioning system wherein a degree of individual control of the distribution of air to individual areas or work stations is possible.

BACKGROUND OF THE INVENTION

Air conditioning systems generally have provided an overall controlled climate within a building or on various floors in a building by providing conditioned air to an area and withdrawing air from the area for return to an air conditioning unit. Fresh air is introduced under controlled conditions as part of the conditioned air.

With the advent of computers, very sophisticated computer controlled systems are now possible and particularly in large, high rise buildings.

However, the sophistication of the system and the attempt at uniform control often detracts from the comfort of the individuals on the various floors of a building and within zones or areas on those floors. It is now acknowledged that few people perceive the effectiveness of an air conditioning system the same, some preferring a cooler environment in which to work, others a slightly warmer climate.

Accordingly, there is a desire to improve the general acceptance of air conditioning systems by evolving a system which offers many occupants of a zone a measure or degree of individual control over the movement of conditioned air in that zone.

There is commercially available a system by Hydro Therm under the trade mark SPACE PAK™ which is often used to provide central air conditioning for older homes or small buildings, particularly those which do not have forced air heating systems. The SPACE PAK™ system locates a blower coil unit in the attic, for example, and provides an insulated plenum in communication with the blower coil unit and from which plenum flexible pre-insulated tubing extends to each room of the house. The flexible tubing may be threaded from floor to floor through closets, between wall studs, or between floor or ceiling joists. Constant volume conditioned air is delivered to air outlets installed in each room of the house in the ceiling, walls or floors.

With houses and small buildings, the SPACE PAK™ system is relatively small and individual control of the air distribution is not considered necessary or desirable as a cost effective system.

Canadian patent No. 1,071,005 of Schmidt et al granted Feb. 3, 1980, relates to a method and apparatus for ventilation or air conditioning occupied rooms and more particularly to a system providing within an occupied room, small zones where thermal conditions are individually adjusted in such fashion that the motion of air may be regulated. This is over and above general room temperature control. The Schmidt et al system provides a primary air climate control system with low velocity air as well as a secondary system, the secondary system providing individual manually controlled adjustable air outlets. These outlets, as part of the secondary system, provide in each of the constantly occupied spaces a "local" climate zone which is distinct from the basic primary climate control conditions. Schmidt et al provides adjustable nozzles at the ends of riser tubes or stanchions to provide the supplemental secondary air to individual work stations or local zones.

The Schmidt et al system has not proven satisfactory in that the only control of supplemental air flow is manual adjustment of nozzles on riser tubes or stanchions. The riser tubes or stanchions are unsightly and can interfere with movement of furniture and people within the areas or zones.

Accordingly there is a need to provide a system which permits a degree of individual control of the flow of air at various locations within particular areas and zones and which will provide at least a perception of cooler conditions within the area or zone due to the movement of air directed to that area or zone.

SUMMARY OF THE INVENTION

The invention seeks to provide an air conditioning system which permits a degree of individual remote control of air conditioning in a zone within a larger area.

Briefly the invention seeks to provide apparatus for use within such air conditioning system and more particularly provides a fitting having a motorized valve for controlling the flow of air to a selected location in the zone. The valve is controlled by remote control through a transmitter and sensor system such as one that utilizes infrared wavelength transmission. A sensor is located in or is associated with an escutcheon plate of a ceiling or wall outlet and is wired to a motor controlling the valve, the valve being in a fitting take-off from a conditioned air branch duct. A controller which includes a transmitter is portable and when an occupant actuates the controller, a signal is transmitted to the sensor, the operator can open or close the valve to control the flow of conditioned air to the zone. Although the controller is portable, it can be located in the zone and may include a temperature sensor to automatically control the valve and thus the flow of conditioned air to the zone.

Accordingly, the invention in one aspect provides means for remotely controlling the flow of conditioned air in an air conditioned system from a duct to a predetermined location of an occupied area of a building. A fitting is secured at one end thereof to the duct and has a moveable butterfly valve mounted therein for selectively controlling flow of conditioned air therethrough, the fitting including a motor and motor control relay for controlling operation of the valve. An outlet is mounted in association with wall means adjacent the location and is spaced from the fitting. A flexible conduit is connected to another end of the fitting and extends from the fitting to and is connected with the outlet. A remote signal receiver is in electrical circuit with the motor and motor control relay and located to receive a transmitted signal and a remote controlled signal transmitter which is signal compatible with the receiver, is provided, whereby an occupant in the location may remotely control through actuation of the transmitter, the position of the valve in the fitting and thus control the flow of conditioned air through the outlet to the location.

The invention also pertains to a method of air conditioning a work area on a floor wherein there is a duct system for conveying conditioned air to the floor and a fitting secured to the duct having a motor controlled valve, the fitting being in air flow communication through a flexible condition to an outlet spaced from the fitting and associated with a wall or ceiling adjacent the work area. The method includes providing signal receiving means mounted in electrical circuit with control means for the motor controlled valve, providing signal transmitter means remote from the outlet and in the work area and selectively activating the transmitter to send a signal compatible with the receiver to control the positions of the valve in the fitting and the flow of air through the outlet to the work area.

Still further, the invention provides a fitting for use in an air conditioning system for controlling the flow of conditioned air from a duct to a remotely located outlet adjacent a selected work station associated with a room. The fitting has means at one end to secure it in flow communication with a duct and a butterfly valve mounted for rotation within the other end of the fitting spaced from the securement means. The fitting has a conical section between said securement means and the other end and a motor is mounted to the fitting other end for controlling the position of the valve and the valve having a flat section which cooperates with adjacent walls of the fitting other end to permit a minimum flow of conditioned air to pass when the valve is in the closed position.

Still further, the invention comprehends an outlet in an air conditioning system for conveying conditioned air to an occupied area, comprising an escutcheon plate having an opening therein and a hollow annular portion extending generally perpendicularly to the plane of the plate and associated with the opening. The outlet includes a signal receiver mounted to the escutcheon plate and there are wires associated with the receiver for operative electrical connection to a valve or the like remote from the outlet when in use which controls the flow of air conveyed through the outlet.

The invention also pertains to an air conditioned system, means for controlling the flow of conditioned air from a a duct to a predetermined location of an occupied area of a building comprising fitting means secured at one end thereof to the duct and having a moveable butterfly valve mounted therein for selectively controlling flow of conditioned air therethrough, the fitting means including motor means for controlling operation of the valve and outlet means mounted in association with wall means adjacent the location to be conditioned and spaced from the fitting. Flexible conduit means is connected to another end of the fitting means and extends from the fitting means to and is connected with the outlet means. Remote signal receiving means include thermostat means and relay means in electrical circuit with the motor means and is located to receive a transmitted signal and there is remote controlled signal transmitter means signal compatible with the receiving means whereby an occupant in the location may remotely set the thermostat through actuation of the transmitter means, the relay means being responsive to the thermostat to control the flow of conditioned air through the outlet to the location.

The invention still further provides an outlet in an air conditioning system for conveying conditioned air to an occupant area, comprising nozzle means including a conduit, support means including means for limited universal mounting of the conduit, the mounting means frictionally holding the conduit in a selected orientation and means for mounting the nozzle support means to false ceiling tile support means.

Other aspects and features of the invention will become evident from the description of a preferred embodiment herein.

BRIEF DESCRIPTION OF THE DRAWINGS

FIG. 5 is a plan view from above and partly in section of the variable volume zone, flexible tubing and outlet.

FIG. 6 shows a perspective view partly in section of the valve fitting.

FIG. 13A is a sectional schematic view of the signal receptor installed in a ceiling tile and taken along line 13A—13A of FIG. 14.

FIG. 13B is a sectional view of a heater element optionally usable with the system.

DESCRIPTION OF THE PREFERRED EMBODIMENT

Figure 1:
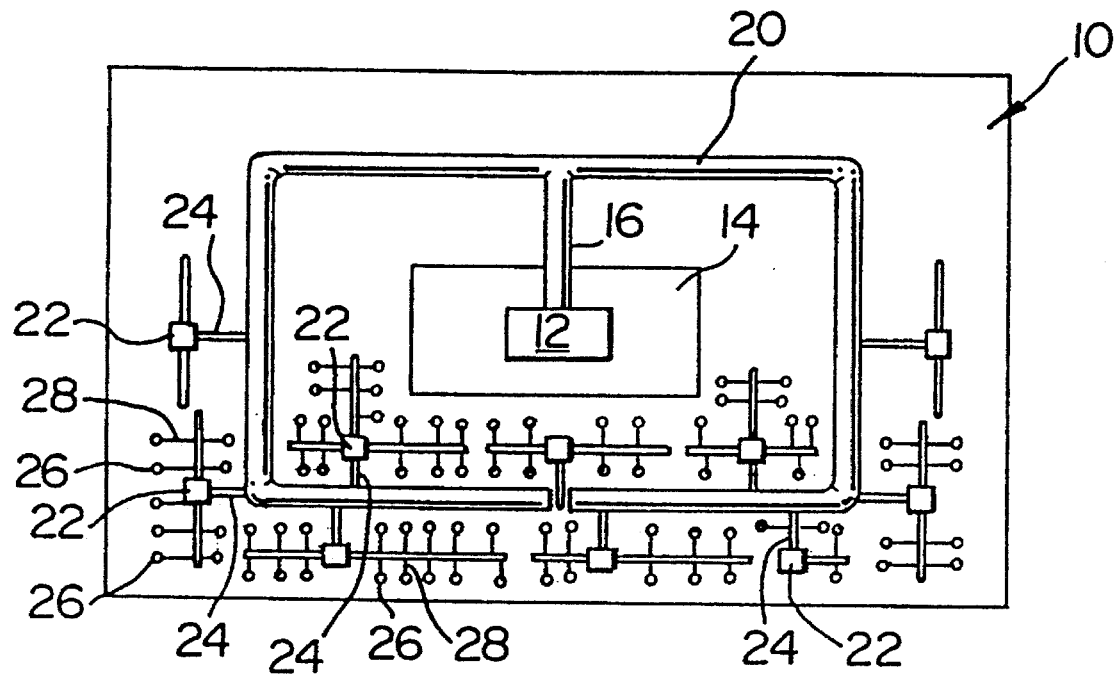
FIG. 1 is a plan view of a typical building section showing a conventional conditioned air duct distribution system for a floor.

Turning to the drawings, FIG. 1 schematically illustrates in plan view a typical, known duct layout for building floor 10 having blower unit 12 capable of feeding conditioned air to all parts of the floor 10. Blower unit 12 may include cooling coil means (not shown) and means for introducing fresh air conducted to the floor (also not shown). However, the invention is not concerned with the means of cooling the air or providing fresh air as part of the conditioned air but rather the distribution of the air from the unit 12. Accordingly, further details of unit 12 or how fresh air is brought into the unit 12 is not considered necessary herein.

Unit 12 is located usually in a centralized area adjacent zone 14, which zone may include elevator shafts, washrooms, maintenance rooms and lobby areas (none of which are shown). Blower unit 12 feeds ring main 20 via conduit 16, which duct 20 in turn feeds variable volume boxes 22 through ducts 24. Boxes 22 feed individual air outlet devices 26 through feeder ducts 28. Through control of the variable volume boxes 22, the cooling condition of various areas or zones on floor 10 may be controlled and adjusted, usually by thermostat control, all of which is well known in the art.

Figure 2:
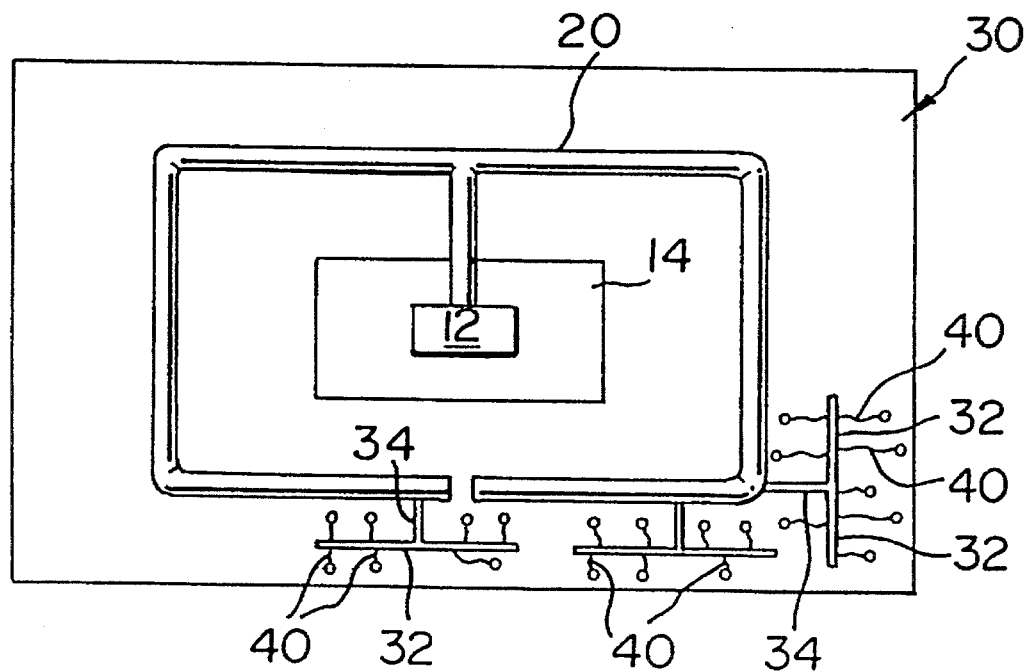
FIG. 2 is a plan view of a building section showing a duct system for distributing conditioned air to various areas and including the variable controlled devices of the invention.

FIG. 2 illustrates a modified duct system for floor 30 as a result of the invention herein wherein blower unit 12 and ring main 20 are the same as in FIG. 1. However, trunk ducts 32 are fed conditioned air from ring main duct 20 through branch ducts 34 and trunk ducts 32 feed a plurality of flexible insulated conduits 40 with conditioned air as more particularly set forth herein. There are no variable control boxes 22 in the embodiment of FIG. 2.

Figure 3:
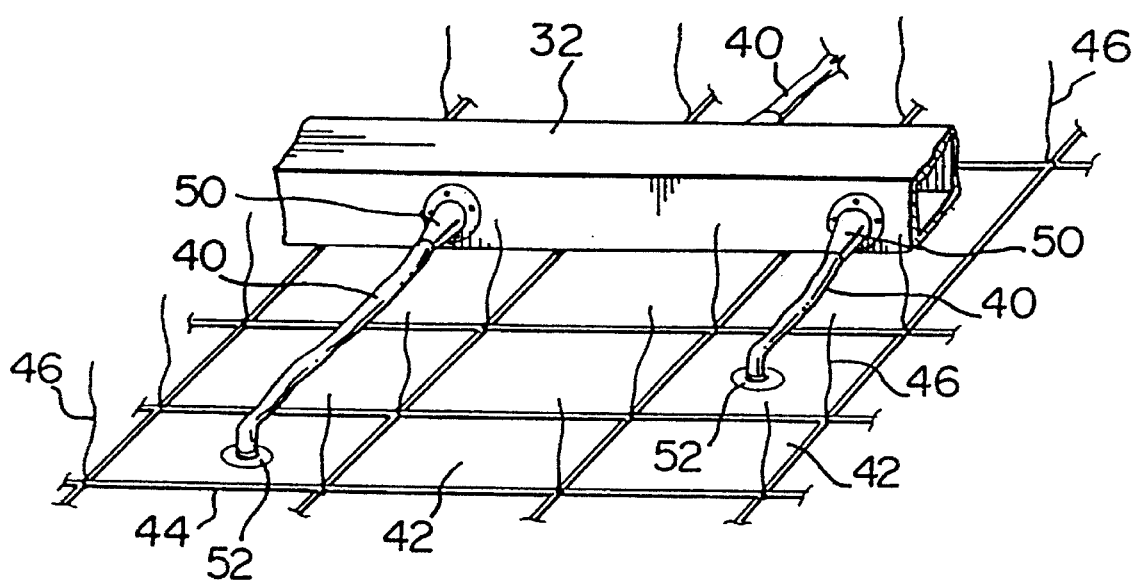
FIG. 3 is a partial perspective view from above of a part of the system taken in the direction of lines 3—3 of FIG. 2.
Figure 4:
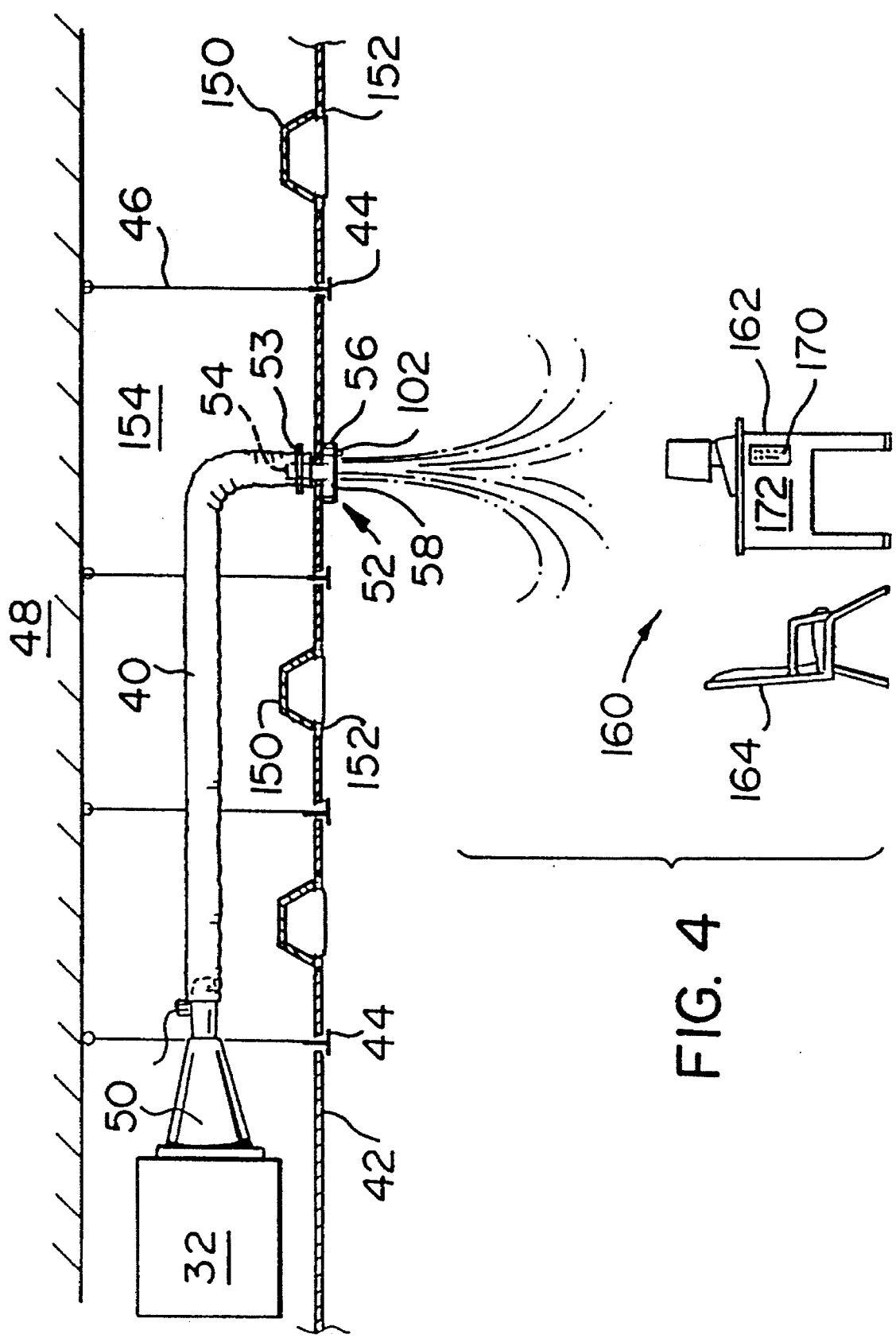
FIG. 4 is an enlarged elevational view of the variable volume zone flexible tubing and outlet at a zone or work station.

FIGS. 3 and 4 illustrate in perspective view and side view respectively, a trunk duct 32 and flexible conduits 40 above false ceiling tiles 42 which are supported in known manner by T-bars 44 and hangers 46 connected to the building floor 48 thereabove (see FIG. 4). As further shown in FIGS. 3, 4 and 5, each flexible conduit 40 is connected through fitting 50 to rectangular trunk duct 32 and extends to an air outlet 52 and connected with cylindrical portion 54 of outlet 52 by clamp 53 as more fully set forth herein. Escutcheon plate 56 of outlet 52 has outer face 58 acting, when installed against ceiling tiles 42, as an appearance plate (see also FIGS. 7–9).

More particularly, as shown in FIGS. 5 and 6, fitting 50 has flange 60 with screw holes 62 for securement to a branch duct 34 by screws 64. It will be apparent that other forms of securement between flange 60 and duct 32 are possible, including known twist-lock systems for connecting ducts in air conditioning and ventilation systems. Fitting 50 has cone section 66 and cylindrical end 68, end 68 being adapted to permit end 70 of insulated flexible duct 40 to be secured thereto by circular clamp 73. It will be appreciated that any form of means of securing connection between duct end 70 and fitting end 68 is possible as with securing connection between duct end 41 and outlet portion 54. Butterfly valve 80 is supported within fitting end 68 by shaft 82 and is supported for rotary movement from an open position to a closed position. Valve 80 has a flat section 84 which allows some air to pass valve 80 even in its fully closed position. Subject to the minimum volume of air passing due to flat section 84, generally the volume of air through flexible conduit 40 is controlled by valve 80. Shaft 82 is supported by suitable bearings 86 secured within fitting end 68. An end 90 of shaft 82 is connected to small electric motor 92 which is supported by fitting end 68 through bracket 94. Also supported by fitting end 68 through suitable bracket 96 is motor relay control 98 supplied electrical power through a 24 volt line 100. As is well known in the art, there is usually a 24 volt power line available in buildings for operating various motorized controls associated with the operation of heating and ventilation systems. As an alternative, motor control could be operated by long life batteries.

Figure 8:
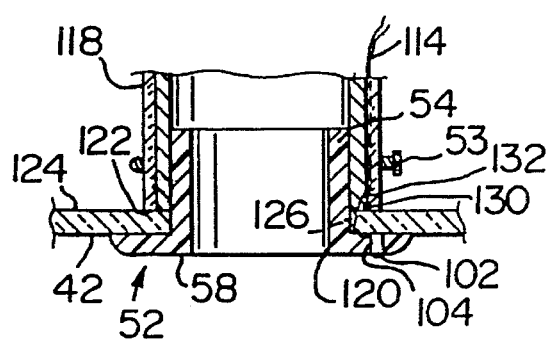
FIG. 8 shows a sectional view of the outlet of FIG. 7 taken along lines 8—8 of FIG. 7.

Turning to FIG. 8, an enlarged cross-sectional view of outlet 52 is shown with escutcheon plate 56 facing ceiling tile 42.

Escutcheon plate 56 has infrared sensor 102 secured in aperture 104 and has at least one LED 106 secured in aperture 108, sensor 102 and LED 106 being operatively wired to motor control 98 through wires 114. Wires 114 preferably run along the flexible conduit 40 between the periphery of the metal conduit and insulation 118. Wires 114 and insulation 118 are preassembled to conduit 40 before use and installation thereof.

Plate 56 faces tile 42 about tile aperture 120, aperture 120 being sized to closely accept cylindrical portion 54 of outlet 52. End 122 of insulated conduit 40 is held against back 124 of tile 42 when circular clamp 53 secures conduit end 122 to cylindrical portion 54. Clamp 53 is of the known circular type of the pipe clamp although any adjustable circular clamp will suffice. Outlet 52 has sensor 102 and LED 106 already installed with wires 126 having known female-male clip means 130 for operative association with clips 132 of wires 114. Flexible conduit 40 and cylindrical portion 54 may be connected and secured with the associated tile 42 in place on T-bars 44 by access through an opening adjacent such tile in which the ceiling tile has not yet been installed. Female-male connections 130 and 132 are connected at this time.

Figure 9:
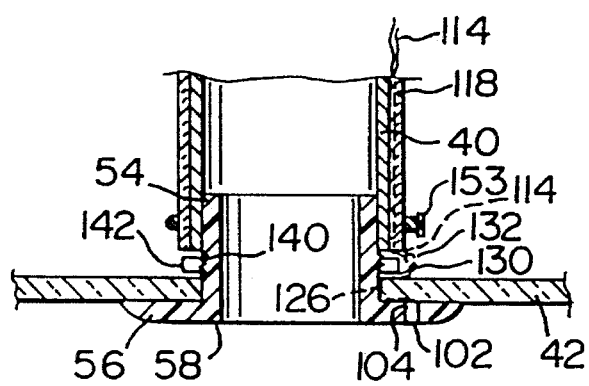
FIG. 9 shows a sectional view of a modified outlet.

A modified outlet 52 is shown in FIG. 9 wherein cylindrical portion 54 of outlet 52 includes a threaded section 140 to which backing plate 142 is in threaded association, enabling the outlet 52 to be preassembled to selected ceiling tiles 42, the tiles sandwiched between escutcheon plate 56 and backing plate 142. Flexible tubing 40 can be secured to cylindrical portion 58 after this selected tile is in place and before other tiles 42 are installed. The simple male-female clip assembly 130, 132 referred to previously, is used with respect to wires from sensor 102 and LED 106 for connection with wires 114.

Figure 7:
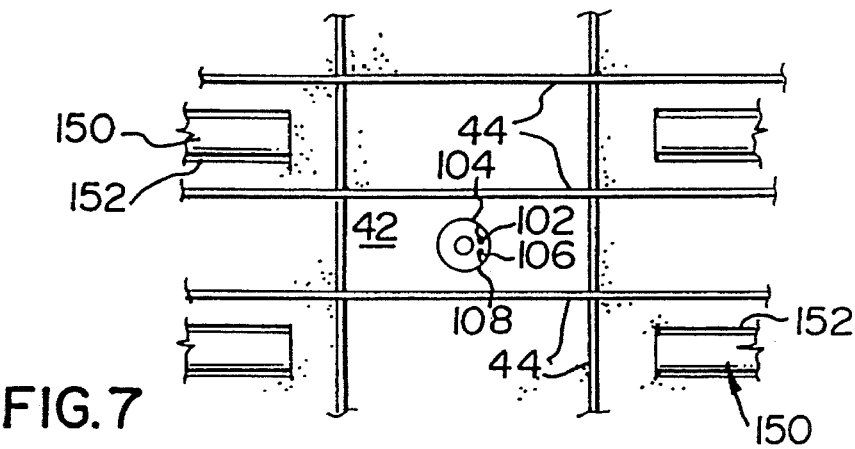
FIG. 7 shows a view of a ceiling outlet from below.
Figure 10:
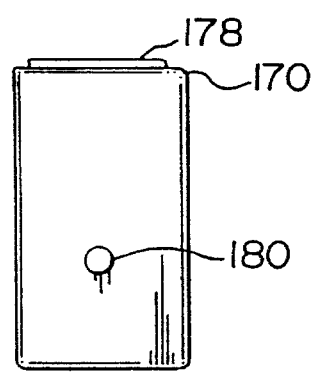
FIGS. 10 and 11 show front and side views of a control device.
Figure 11:
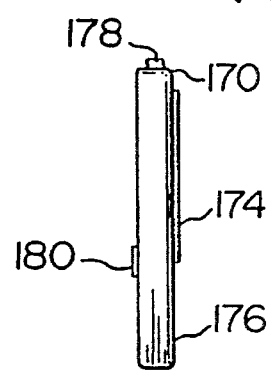

Returning to FIG. 4, there is illustrated fitting 50, conduit 40 and outlet 52 in elevation along with ceiling tiles 42 and T-bars 44 and hangers 46. Also shown and shown in FIG. 7 are known fluorescent light units 150 which include lateral gaps 152 permitting air return to plenum 154 which is between tiles 42 and building floor 48, all of which is common in the art. As shown in FIG. 4, air exiting from outlet 52 is directed downwardly to work station 160 having a desk 162 and chair 164. Associated with work station 160 is hand held control 170 which is detachably secured to side 172 of desk 162. FIGS. 10 and 11 show an enlarged plan view and side view respectively of controller 170 with fastener means 174 on the back 176. Fastener means 174 and like means (not shown) on the desk side 172 may be of the hook and pile type such as that marketed under the trade mark VELCRO. The detachable association of hand held control 170 is exemplary and is not required. Other means of conveniently retaining control 170 at a work station location 160 may be used as will be appreciated by those skilled in the art. The desk and chair are also only exemplary of the work station, and other forms of equipment and furniture, such as drafting tables, within an area are possible and contemplated.

Control 170 has a battery operated infrared transmitter (not shown) through end 178 which transmitter is compatible with infrared sensor 102 in escutcheon plate 56. The transmitter within control 170 and sensor 102 are of known technology (such as used in some remote TV control systems) and further details of this technology is not believed necessary herein. Known ultrasonic transmitter/receiver technology is also useable in this system for control of the fitting valve 80.

LED 106 on escutcheon plate 56 is lighted when valve 80 is fully open and not lighted when valve 80 is closed. Button 180 on control 170 causes motor 92, through motor control relay 98, to cycle, whereby valve 80 will continue to move from closed to open to closed positions while depressed or actuated. LED 106 is not illuminated when valve 80 is fully closed even though a minimum passage of conditioned air is permitted to pass through conduit 40 and outlet 52 in view of the opening defined by the inner periphery of fitting end 68 and flat section 84 of valve 80. Release of button 180 stops motor 92 so that valve 80 assumes the position at the time of such release. LED 106 is lit indicating the valve is positioned to permit more than the minimum flow referred to above.

It will be appreciated that the perception of increased air flow may be all that is required for some people at work stations. However, others may prefer a more clear indication of the positioning of valve 80 such as ¼ open, ½ open, ¾ open and fully open. This may be accomplished by additional differently colored LEDS in escutcheon plate 56, one for each position and wired into the motor control or relay 98 through additional wires 114, the motor control sending out the appropriate signal to indicate the positioning of the valve.

An even more sophisticated system for indicating valve position may be provided if escutcheon plate 56 is provided with a receiver-transmitter and control 170 also has a receiver. In this case, a meter or dial may be provided on control 170 showing the position of the valve 80. Further, it will be appreciated that transmitter-receiver technology is such that a thermostat control can be incorporated into control 170 thereby controlling the flow of conditioned air to the zone (and the temperature associated therewith) when the thermostat is set on the control 170.

It will still further be appreciated that control 170 and/or receiver 102 may incorporate means providing an audio signal to indicate valve position for visably impaired occupants.

In using the system, fittings 50 would be manufactured and assembled as a unit including valve 80, motor 92 and motor control or relay 98 and shipped to the site. Flexible tube 40 would likewise be fabricated off site to a specified length with wires 114 running between insulation 118 and the tubing forming conduit 40, the wires extending from each end thereof. The wires would even have appropriate clips thereon for site connection to the wires of the outlet LED 1 receiver. If necessary, conduit 40 may be cut to a shorter length on site prior to installation with wires 114 being left at the longer length if clips were preassembled to the wires.

Once fitting 50 is mounted on a trunk duct 32, end 70 of conduit 40 is secured by clamp 73 to fitting end 68 and the other or free conduit end 122 located in the ceiling plenum 154 for connection to the outlet 52. A tile 42 preassembled with escutcheon assembly as shown in FIG. 9, is located within the appropriate T-bars 44 and free end 122 of conduit 40 is connected via clamp 53 to outlet portion 54. Clip connection of wires 114 to wires 126 of LED 106 and sensor 102 completes the installation.

Although blower unit 12 provides predetermined flow of conditioned air through ring main 20, branch duct 34 and trunk duct 32, an individual at a particular location may adjust the flow of air into his/her particular area. More particularly, due to the flat section 84 on valve 80, there is always some conditioned air from the blower unit 12 exiting from outlet 52. However, if the individual wishes to increase that flow of air in order to provide the perception of cooler conditions through increased air flow, he/she may further open valve 80 by aiming the infrared transmitter of controller 170 towards sensor 102, pushing button 180 and through motor control relay 98 motor 92 is caused to open valve 80. If less air flow is desired, further pushing button 180 will cause motor 92 to cycle to fully open and then back towards a closed position.

In the preferred embodiment, the fitting 50 is of aluminum and the outlet 52 of plastic material. Conduit 40 is of flexible metal, insulated with known insulation. It will be appreciated that fitting 50 may itself be covered with insulation material although such is not shown in the drawings. An exemplary fitting 50 has a flange 60 of about 1 inch width with cone 66 reducing from about a 6" internal diameter at flange 60 to about 2 inches internal diameter at end 68, the cone portion 60 and end portion 68 both being about 4 inches in length. Cylindrical portion 56 is also about 2 inch internal diameter and so is flexible conduit 40.

Figure 12:
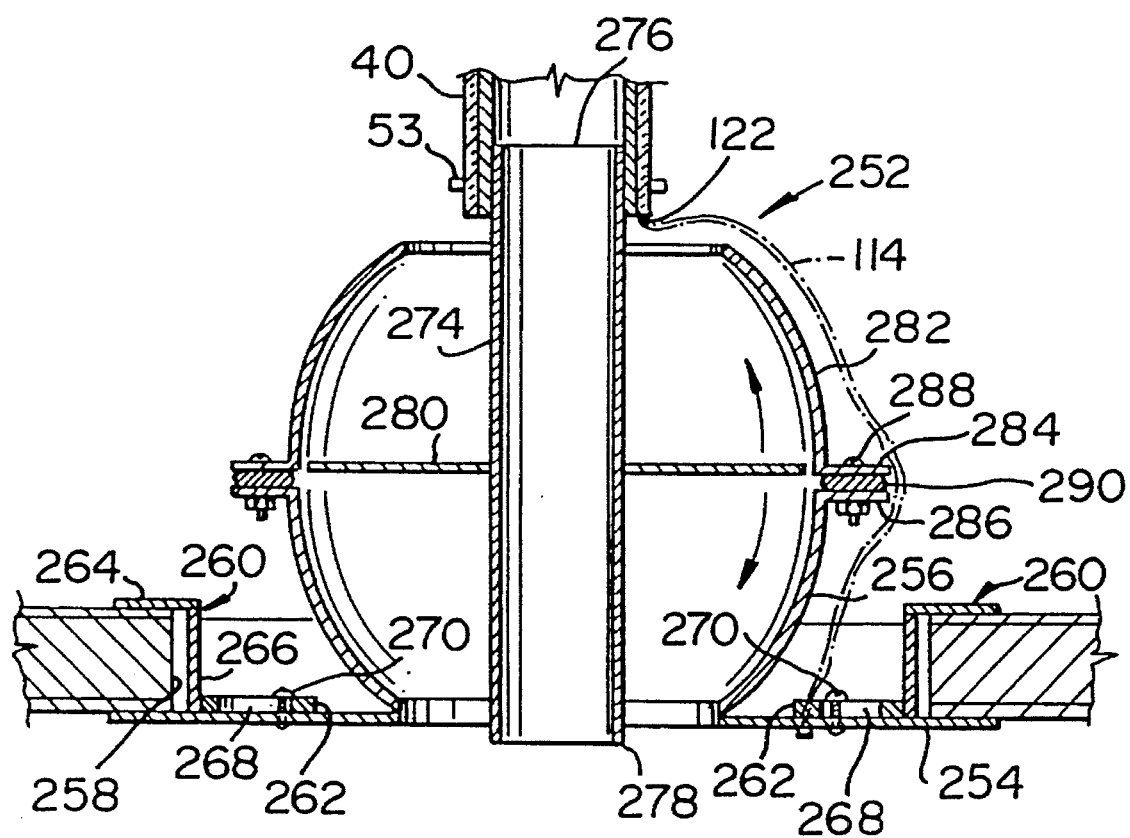
FIG. 12 shows a sectional view of a modified outlet and escutcheon plate assembly.

Shown in FIG. 12 is a variation in the ceiling/wall outlet and is designated 252. Outlet 252 has generally squarish appearance plate 254 to which is integrally secured semi-spherical housing portion 256. Plate 254 is secured against tiles 42 about aperture 258 by clips 260, a suitable number being spaced circumferentially in association with aperture 258 and plate 254 to be able to secure plate to tile 42. Each clip 260 is generally Z-shaped and includes lower leg 262 and upper leg 264 joined by intermediate portion 266. Lower leg 262 has elongated aperture 268 through which screws 270 extend, the elongated apertures 272 permitting clips 260 to slide from an inward to an outward position in securing plate 254 in place. Cylindrical tube 274 has end 276 for connection with end 122 of conduit 40 through clamp 53 and has outlet end 278. Tube 274 is integrally mounted to circular plate 280. Semi-spherical restraint housing 282 has peripheral flange 284 for bolting to peripheral flange 286 of semi-spherical housing 256 by peripherally spaced bolts 288 and circular seal 290.

The diameter of plate 280 is substantially the same as the internal diameter of the generally spherical assembly of housing 256 and restraint 282 so that there is a slight friction fit. The fit is such that the angular orientation of the tube 274 relative to the plane of appearance plate 254 may be altered to direct air flow at an angle rather than vertically downward. This arrangement provides for increased flexibility of directing the air flow at a particular work station if, after installation of the duct system, some movement of furniture or the like is desired. Tube 274 is not intended to be moved frequently and therefore is moved by a stick (ruler) or the like inserted into end 278. An obvious alternative would be to move tube 274 by hand by standing on a chair or ladder as is often done in changing light bulbs.

Variations in the system are possible as will be appreciated. Although appropriate official clearance would be required, a remote electronic FM transmitter/receiver system could be used to control valve 80. The receiver could be mounted by brackets on fitting 50 with the antennae helically wrapped about cone section 66. This embodiment would require selected FM frequencies coded into each control unit so that a control unit would operate a signal only for the fitting valve for which it is designed.

Figure 13:
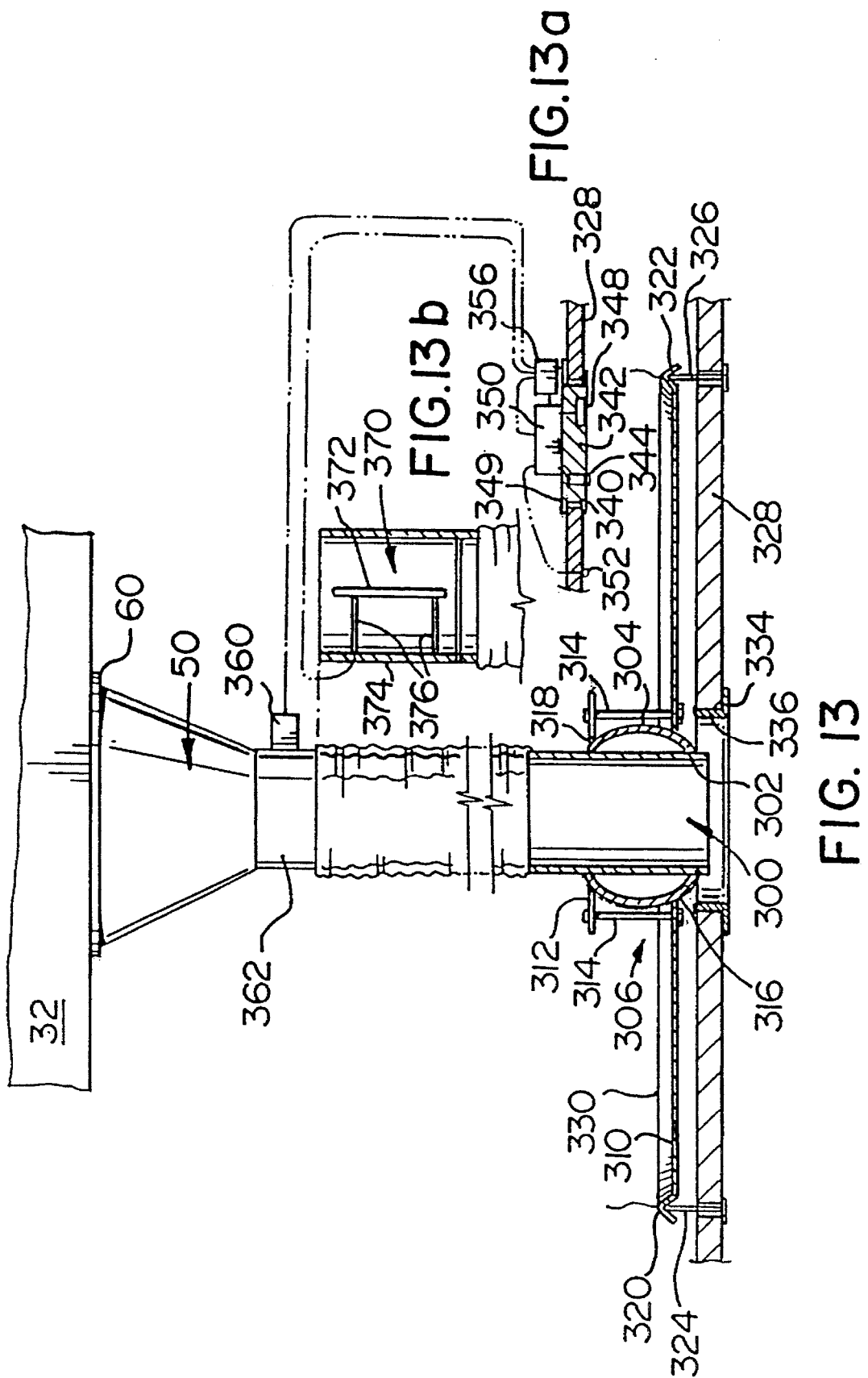
FIG. 13 is a schematic illustration, partly in section, of a modification of the invention and in particular the nozzle or jet supported from the ceiling "T" frame and taken along line 13—13 of FIG. 14.
Figure 14:
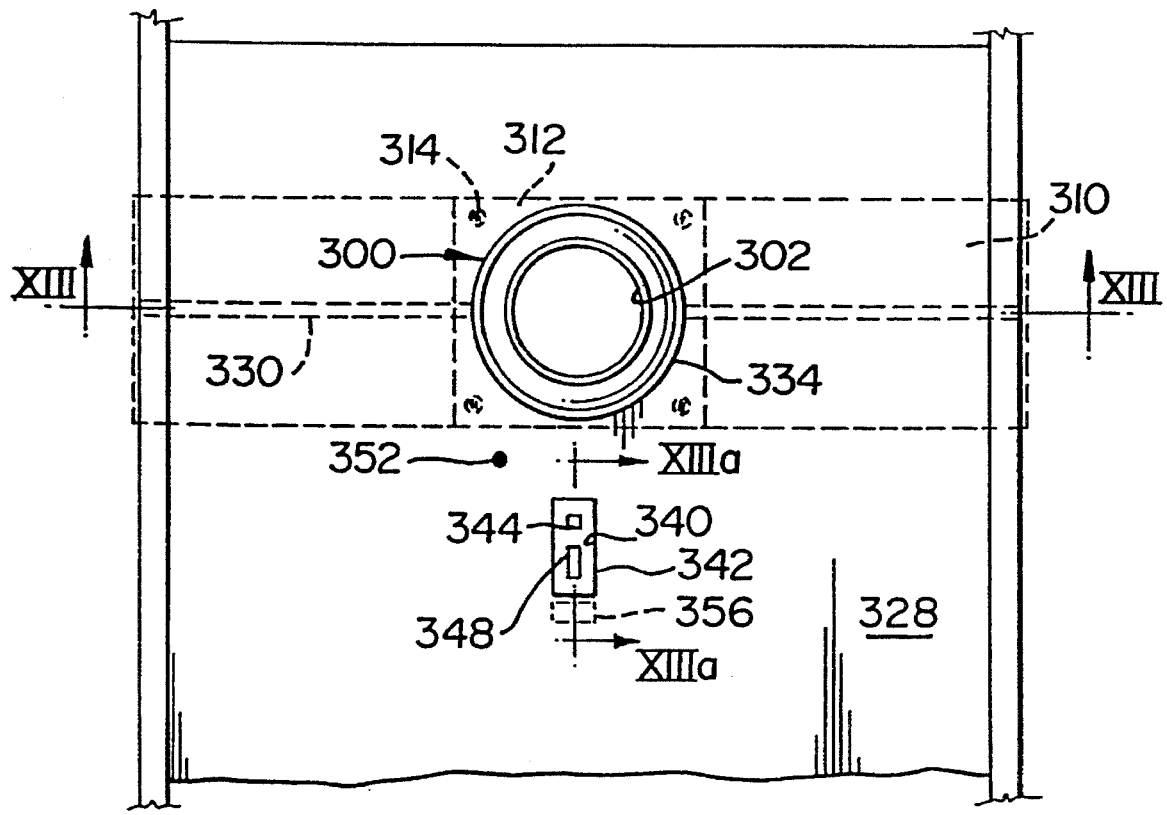
FIG. 14 is a view upward toward the ceiling tile illustrated in section in FIGS. 13 and 13A.

FIGS. 13–14 illustrate a further embodiment of the invention.

FIG. 13 illustrates an air outlet nozzle 300 having a 4 inch diameter plastic tube 302 inserted into and secured to a plastic globe 304 about 7 inches in diameter. Globe 304 is restrained within frame 306 comprising elongate front plate 310 and back plate 312 which are held together by elongate screws or bolts 314 within openings 316 and 318 in the respective plates 310 and 312. Frame 306 holds globe 304 for limited pivotal or angular movement of upwards of 22½° in any direction relative to frame 306. Screws 314 with back plate 312 allow restraining frame 306 to snug the globe 306 to any tightness required to maintain a set position. Front plate 310 is long enough that it fits within the span between and can be secured at ends 320, 322 to adjacent T-bars 324, 326 supporting a false ceiling tile 328. Longitudinal stiffening crease 330 provides strength to plate 310. The round escutcheon plate 334 provides trim for the hole 336 cut in the adjacent ceiling tile 328.

Adjacent ceiling aperture 336, perhaps a foot away, is a second hole 340 cut in the tile 328 to house a receptor 342 with eye 344 to receive signals from a remote control device and with electric luminescent numbers 348 to spell and illustrate temperatures at a 1° F. difference from about 68° F. to 77° F. (1° C. difference between 20° to 25° C.) The receptor 342 may be mounted by a back plate bracket 349 to the ceiling tab or could be supported by a plate, not shown, associated to but at right angles to plate 310.

The remote control, not shown but like that in FIGS. 10 and 11, is used simply to digitally set the desired temperature and the temperature remains lit on the receptor numbers 348 from then on until the occupant of the space desires to signal a different temperature with the appropriate remote control.

Receptor 342 has a thermostat 350 and a sensor 352 which senses room air temperature as the aspirated room air streams scrub the ceiling tile when they are being drawn into the supply air jet from nozzle 300.

A relay 356, separate from the receptor 342, is located alongside in the false ceiling space and supported by suitable means not detailed or by back plate 349 and relay 356 converts 1/60/110 volt or 1/60/24 volt supply to 6 volt D.C. This 6 volt D.C. supplies power to the damper motor control 360, in fitting 362 associated with duct 34 and also powers the on line thermostat 350 and the electro luminescent figure 348.

Relay 356 also operates an optional 250 watt 1/60/110 volt electric heater 370 for jets or nozzles 300 located in perimeter space, i.e. spaces adjacent the fabric of the building, as heat may be called for by the thermostat 350. Heater 370 is a Calrod element 372 secured axially in a 4 inch diameter by 12 inch long metal tube 374 by supports 376 and located after damper fitting 362 and secured thereto as shown schematically in FIG. 13B, the flexible conduit 40 thereby being attached to heater 370.

Relay 356 includes the ability to set a maximum opening position for the damper through motor control 360. An air balance technician can set this "position" if heavier air pressures close to a central fan are liable to permit some outlets to rob air from others further downstream. If a heater 370 is associated with the damper fitting 362, the relay 356 will automatically open the damper to its maximum position wherever the heater is activated. Further, the relay 356 provides an adjustable temperature offset in case the temperature at the ceiling is diffferent than the temperature at a desk or the like in a work area being served by the nozzle or jet 300.

Accordingly, in this embodiment, the outlet 302 provides for up to a 22½° swivel of nozzle 300 for directing the air at a desired angle into the area being conditioned, the direction being capable of effectively being fixed during installation through increased tension on screws 314.

The tension of screws 314 however may be made such as to permit selective redirection, if desired, through use of a stick or the like inserted into the nozzle opening 302 and levering the nozzle to the desired position. Obviously the nozzle can be redirected by an appropriate technician lifting adjacent ceiling tiles and readjusting the position through loosening and retightening screws 314.

It will be noted that in this embodiment, the remote control does not operate the damper directly but instead sets thermostat 350 which then suitably instructs relay 356 to control the damper in fitting 362 through motor control 360 and resets the electro-luminescent numbers 344. The relay 356 will also control the heater 370 if one is associated with the damper fitting 362 when the appropriate temperature is set by the remote.

Figure 15:
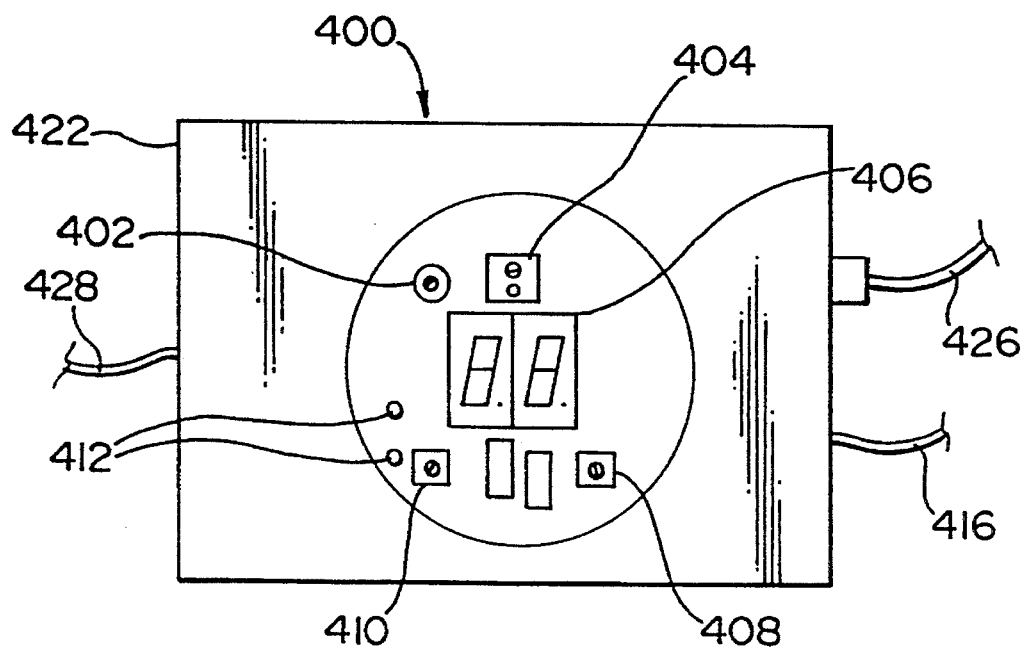
FIG. 15 is a plan view of a receptor.

FIG. 15 is a view of a modified receptor designated 400. Receptor 400 has a temperature sensor 402, infrared sensor 404, numeral (digital) temperature display 406, a maximum baffle opening adjustment screw 408 and set point adjustment screw 410. Also shown are setpoint voltage terminals 412.

The receptor 400 is associated with a power 3 wire cord 416 to bring power to the device. The temperature numeric display 406 is capable of reading 1° C. at a time from 20° C. to 25° C. (or the equivalent of °F.). The circular round plastic face 420 of receptor 400 projects about the thickness of a ceiling tile from the circuit control box 422 which contains the circuit board, relays and the like (not shown).

Temperature sensor 402 projects downward below the face 420 when the receptor 400 is mounted in a ceiling tile. The box 424 includes a relay (not shown) which engages a 1/60/110, 300 watt heater such as that shown as 372 in FIG. 13*b* only for air jets located in perimeter orifice zone. This relay has a wire cable 426 connected via a retractable plug to a heater element such as 372. There is, of course, a low voltage cable connected with box 428 which connects with and engages the damper motor and an appropriate transformer and DC rectifier (not shown) to create the 6 V or 12 V voltage for the damper motor. Although not shown, on the face 420 there could also be included an appropriate LED display of red dots to show the percentage of damper opening.

The control box 422 includes an appropriate chip and circuitry for a number of functions including that necessary:

to send analogue signals from the thermostat to set the damper in a position to maintain the set office temperature;

to display signal temperature at the thermostat sensor when requested to do so by a remote device;

to provide a maximum damper opening for cool air. This will be set by the air balance technician either by screwdriver adjustment at the face of the numeric display (set screw 408) or additional circuits could provide remote adjustment from a hand held operator control;

to provide a minimum damper opening for hot air when the relay engages the electric heater. This is to be set as above similar to the maximum damper opening;

to provide a temperature offset (set screw 410) so that if the ceiling temperature is typically higher, by say 2° C. than the temperature at the desk, the numeric readout will control the at desk temperature instead of the temperature it is measuring at the ceiling. This offset will also apply to the temperature indication numeric display 406. This control will be set as above with either screw or remote adjustment.

The remote hand control associated with receptor 400 is infrared battery driven and about the size of a typical TV or stereo remote. It incorporates a means of moving the setpoint of the local thermostat up and down 1° C. at a time. This means preferably includes two buttons, one to move temperature setting up and one to move temperature setting down.

A third button, when pressed, would give a signal of about 3 seconds duration giving temperature at the thermostat location (subject to the offset).

With respect to set point adjustments, the remote is used to set the temperature display at 20° C., then the voltage at the terminals 412 is measured and the reading is set to 0.200 V, 0 degrees offset (10 mV/0° C.). The set point screw 410 is then adjusted to the required value. With respect to maximum baffle opening adjustments, again with the remote the temperature display is set to 20° C. with the room temperature above 20° C., the technician waiting for the baffle to fully open before rotating the maximum baffle opening adjustment 408 to obtain the desired position for the particular location of the nozzle.

Applicant's invention provides the ability to drive air actively into the working zone without additional fans and without circulating large volumes of supply air. In laboratory testing, the jet or nozzle systems of the invention projected air downward in less than 1% of the area served. The air then spread generally horizontally and rose uniformly in a horizontal plane to be captured by ceiling return air slots, which slots are well known in the art. Thus the system provides a form of displacement ventilation, where air delivery rises "bottom upward" to capture pollutants generated by occupants and equipment and lifts them upwardly and away through the return air slots. Thus the air is warmer (by about 3° F. (2° C.)) at the false ceiling, the temperature differential between supply and exhaust air is increased and less air speed be circulated. Energy can be saved and ducts and equipment can be smaller. The location of air temperature sensor 352 or 402 is such as to detect the temperature of the ceiling air in the area of nozzle 300 which is pulled into the air stream exiting from the nozzle. If necessary, relay 356 or 410 may be adjusted, as noted previously, to provide a temperature offset between that measured at the ceiling and that shown by the electro-luminescent numbers 344 or 406. For example, measuring 71° air at the ceiling would cause the numbers to show 68°, the temperature desired at the level where the occupant works.

It will also be appreciated that appropriate wiring and circuitry can be included in box 422 for a connection with an overall building automation system which could be used to obtain a central read-out of the temperature or temperature setting of the location and each of the other locations of similar devices in the system.

Variations on the invention as illustrated by FIGS. 13–15 will be apparent to those skilled in the art and I claim all variations reasonably falling within the scope of the appended claims.

The embodiments of the invention in which an exclusive property or privilege is claimed are defined as follows:

1. In an air conditioning system, means for controlling the flow of conditioned air from a duct to a predetermined location of an occupied area of a building comprising:

fitting means secured at one end thereof to said duct and having a moveable valve mounted therein for selectively controlling flow of conditioned air therethrough, said fitting means including motor means and motor control means for controlling operation of said valve;

outlet means and means mounting said outlet means in association with an aperture in a ceiling tile adjacent said location to be conditioned and spaced from said fitting means;

said outlet means including nozzle means having an inner end and an outer end;

flexible conduit means connected to another end of said fitting means and extending from said fitting means to and connected with the inner end of said nozzle means;

said means mounting said outlet means including means for mounting said nozzle for selected, limited universal movement relative to said ceiling tile aperture;

remote signal receiving means located adjacent said outlet means for receiving a transmitted signal and including thermostat means and relay means in electrical circuit with said motor means; and remote controlled signal transmitter means signal compatible with said receiving means whereby an occupant in said location may remotely set the thermostat through actuation of said transmitter means, said relay means being responsive to said thermostat to control said motor and the position of said valve in said fitting and thus control the flow of conditioned air through said outlet to said location as a result of said thermostat setting.

2. The system of claim 1 further including means associated with said receiving means which provide a visual indication of the thermostat setting to the occupant in said location.

3. The system of claim 1 including heater means associated with said fitting means, said heater means being operatively connected to said relay means to provide heat to the air flow through said conduit means in accordance with the thermostat setting.

4. The system of claim 3 wherein said relay means automatically fully opens said valve when said heater is activated by said relay means.

5. The system of claim 1 wherein said nozzle includes a spherical portion and said means mounting said nozzle including cage means supporting said spherical portion for selective, limited universal movement therein.

6. The system of claim 5 wherein said outlet mounting means includes a elongate plate supporting said cage, said plate having means adapted to be supported on laterally adjacent "T"-bars which support the apertured ceiling tile associated with said nozzles.

7. The system of claim 1 wherein a temperature sensor associated with said thermostat is located in association with a ceiling tile adjacent said nozzle and across which the tile air is caused to flow by movement of air through the nozzle.

\* \* \* \* \*